United States Patent [19]
Grewette et al.

[11] 3,917,035
[45] Nov. 4, 1975

[54] ELECTRIC BRAKE ADJUSTER

[75] Inventors: Richard S. Grewette, Utica; Edward J. Woods, Warren, both of Mich.

[73] Assignee: General Motors Corporation, Detroit, Mich.

[22] Filed: Feb. 18, 1975

[21] Appl. No.: 550,462

[52] U.S. Cl............ 188/161; 188/71.9; 188/196 BA
[51] Int. Cl.² .................... F16D 55/14; F16D 65/54
[58] Field of Search ......... 188/71.8, 71.9, 79.5 GE, 188/158, 161, 163, 164, 196 B, 196 BA

[56] References Cited
UNITED STATES PATENTS

| | | | |
|---|---|---|---|
| 1,971,643 | 8/1934 | De Lavaud............ | 188/196 BA X |
| 2,106,167 | 1/1938 | Colman.................. | 188/196 BA X |
| 2,669,327 | 2/1954 | Chamberlain et al.... | 188/196 BA X |

*Primary Examiner*—Duane A. Reger
*Attorney, Agent, or Firm*—D. D. McGraw

[57] ABSTRACT

An electromagnetically actuated disc brake provides for adjustment of the magnet pole faces as the brake lining wears so that the faces remain closely adjacent the surface of the disc to be braked so as to minimize the air gap therebetween, but does not engage the disc in brake force transmitting relation during brake actuation. The annular magnet has the field coil mounted in an annular recess and the friction lining secured in the outer portion of the recess and extending axially from the magnet. The inner and outer peripheries of the magnet have threaded sections or threaded members secured thereto. Annular magnet poles are positioned so that they are threaded on the threaded sections, located radially inward and outward of the friction lining, and have faces immediately adjacent the friction braking surfaces of the disc. When the disc is rotating in a forward direction and the friction lining has worn sufficiently so that the faces of the magnet poles engage the forwardly rotating disc during brake actuation, the drag causes the magnet poles to rotate in the direction of disc rotation, with the thread action causing the poles to move axially away from the disc to maintain their adjustment. A suitable ratchet mechanism is provided for each of the magnet poles so that they can be rotated only in one direction. Therefore when the disc is rotating in the reverse direction the magnet poles cannot be moved by any drag that may occur to thread them toward the disc. The ratchet is manually releasable to readjust the magnet pole positions when the friction lining is replaced.

2 Claims, 3 Drawing Figures

ELECTRIC BRAKE ADJUSTER

The invention relates to an electromagnetically actuated brake which has a mechanism forming a magnetic flux path between the brake magnet and the rotatable member to be braked, the mechanism including means adjusting it as the friction element wears to prevent braking force engagement between the mechanism and the rotatable member while permitting braking force engagement between the friction element and the rotatable member and maintaining a minimum air gap between the mechanism and the rotatable member. The invention more particularly includes first and second annular threaded sections respectively provided on the inner and outer peripheries of an annular brake magnet, first and second annular magnet poles having threads thereon and threaded on the threaded sections for rotational movement relative to the annular magnet and resultant axial movement as the poles are threaded further onto the threaded sections. The magnet poles have faces immediately adjacent the rotatable member and engageable therewith upon wear of the friction element and brake energization. This engagement is sufficient to rotate the magnet poles on the magnet in the direction of rotation of the rotatable member during its forward rotation, and by thread action to move the magnet poles axially away from the rotatable member so that the braking force is exerted on the rotatable member by the friction element and not by the magnet poles. The magnet and the threaded sections thereof, the magnet poles, and the rotatable member provide the magnetic flux path for the brake when the field coil located in the magnet is electrically energized. Selectively releasable means are provided on the magnet and the magnet poles which prevent rotation of the magnet poles upon engagement with the rotatable member during reverse rotation of the rotatable member. This prevents the magnet poles from being moved axially toward the rotatable member under such conditions.

By having only the friction material contact the disc or other rotatable member during brake actuation, a uniform and predictable coefficient of friction is realized by the actuator and the rotatable member. By providing for engagement of the magnet pole faces and the rotatable member only when adjustment is required and then only momentarily as adjustment is obtained, surface galling is minimized.

IN THE DRAWING

Figure 1:
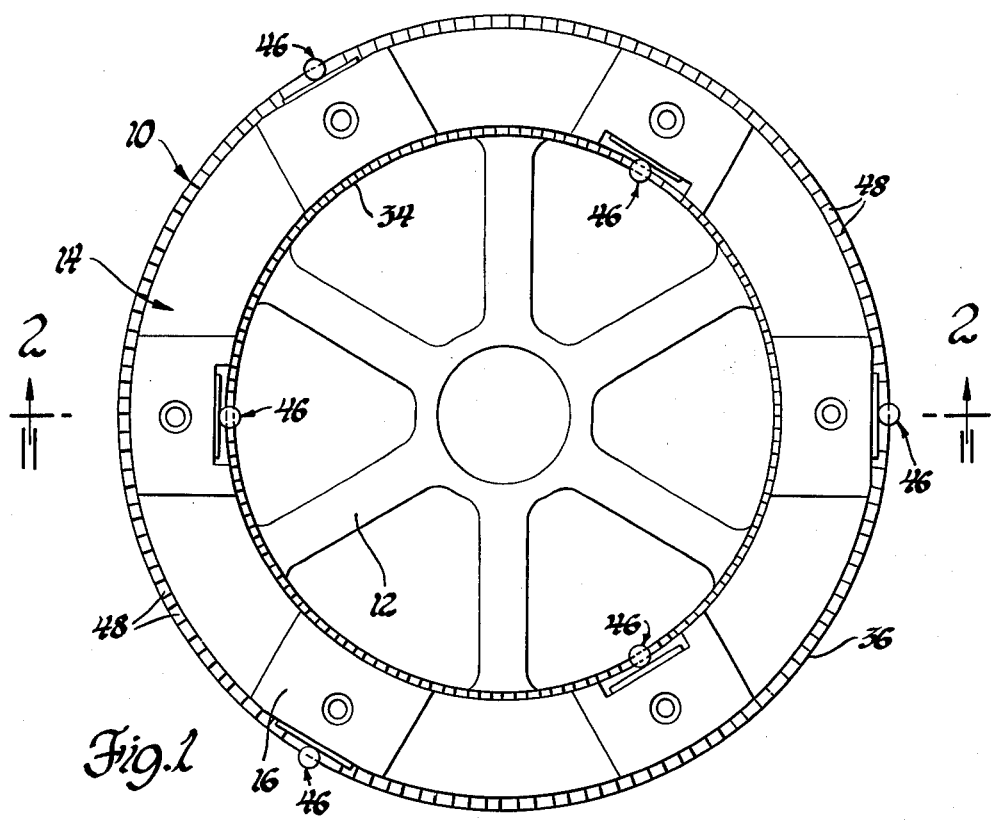
FIG. 1 is an elevation view of a brake member of the invention.
Figure 2:
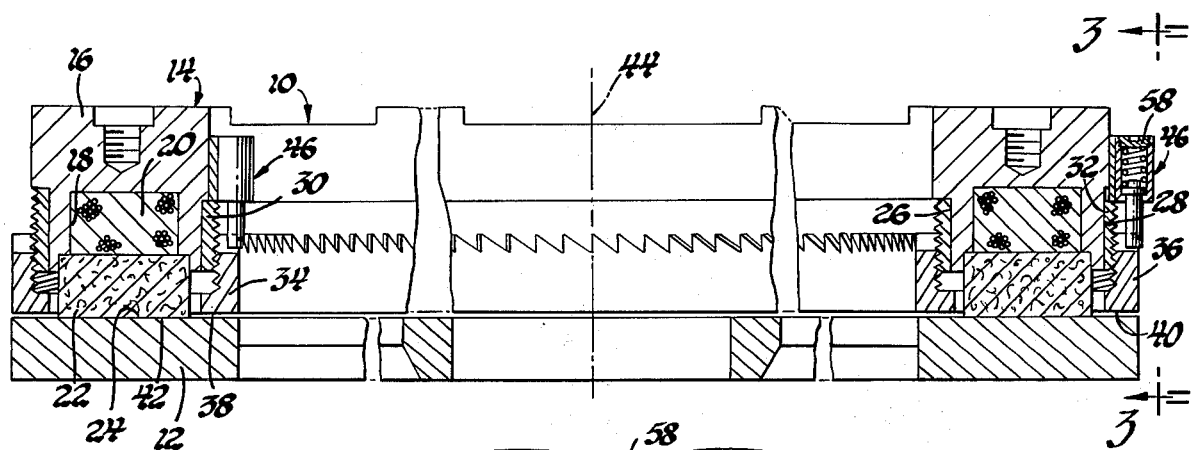
FIG. 2 is a cross section view of the brake illustrated in FIG. 1 and taken in the direction of arrows 2—2 of that FIGURE.

The brake assembly 10 illustrated in the drawing includes a rotatable disc 12 to be braked, and an electromagnet brake actuator assembly 14. Assembly 14 includes an annular magnet 16 provided with an axially extending recess 18. A field coil 20 is mounted in recess 18 and is suitably arranged for variable electrical energization and deenergization in accordance with braking requirements. An annular friction member 22 is secured in the open end of recess 18 and extends axially beyond the magnet toward the friction braking surface 24 of disc 12. The magnet 16 has an inner peripheral surface 26 and an outer peripheral surface 28 respectively provided with threaded sections 30 and 32. Depending upon the material used, these sections may be an integral part of magnet 16 or may be separate annular sleeve-like members as illustrated in FIG. 2. A material such as ingot iron, which has good magnetic properties, is preferably used for magnet 16 and the magnet poles 34 and 36. Threaded sections 30 and 32 can be made of steel, so that galling between the threads is effectively prevented. The steel sections 30 and 32 are kept to a minimum size so that the maximum value of magnetic flux density is not significantly lowered as compared to a construction using only ingot iron, and is significantly higher than it would be if either the magnet or the magnet poles were made of steel. The disc is also made of a material having good magnetic properties. Thus the magnetic flux path has an effective magnetic flux density which efficiently utilizes the electrical current in the field coil to produce sufficiently high braking forces for use in automotive vehicle brake systems, for example.

The threaded annular magnetic poles 34 and 36 are each threaded onto a threaded section or member, the inner peripheral magnet pole 34 being threaded on member 30 and the outer peripheral pole 36 being threaded on member 32. The magnet poles extend axially toward the disc surface 24 and are normally positioned so that they are immediately adjacent that surface but do not engage it during brake operation. The friction member 22 extends axially slightly beyond the magnet pole faces 38 and 40 so that its friction surface 42 engages the disc surface 24 during brake actuation. The cooperating threads of members 30 and 34, and members 32 and 36, are so pitched that rotational movement of the magnet pole members in the same direction of rotation as the forward direction of rotation of the disc 12 will cause the pole members to move parallel to the axis of rotation 44 and away from the disc surface 24.

Figure 3:
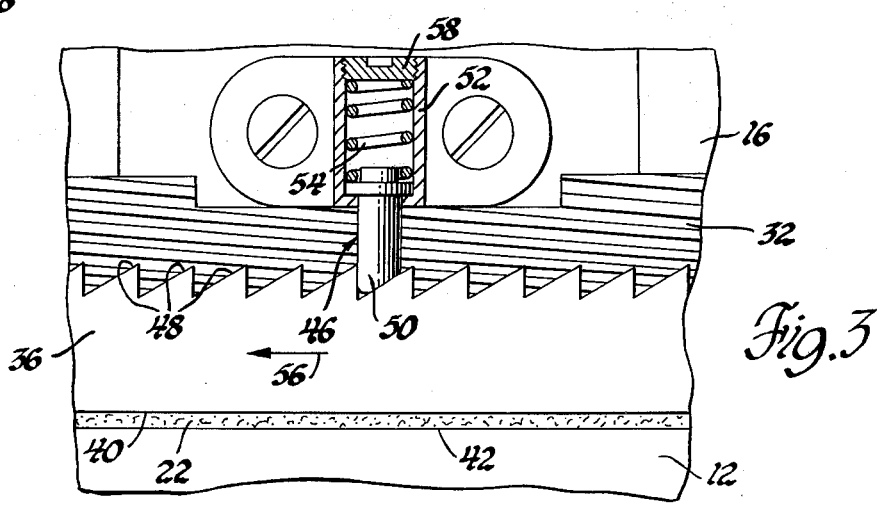
FIG. 3 is another view of the brake taken in the direction of arrows 3—3 of FIG. 2 and showing only a fragmentary portion of the brake.

It is not desirable to have the adjusting mechanism work in a reverse manner since this would cause the magnet poles to move axially toward the disc and defeat the purposes of adjustment. In order to prevent such adjustment when the disc is being braked while rotating in a reverse direction, suitable releasable means are provided which permit rotation of the magnet poles only in the forward direction of disc rotation. While various forms of such means may be used, a typical arrangement is illustrated in FIG. 3. It includes a ratchet assembly 46 formed by the teeth 48 on the portion of magnet pole 36 axially opposite its face 40, a plunger 50 reciprocably mounted in a housing 52 attached to magnet 16, and a spring 54 biasing plunger 50 into ratcheting engagement with teeth 48. In the embodiment illustrated, three such ratchet assemblies are provided for the outer peripheral magnet pole 36, and three similar assemblies are provided for the inner peripheral magnet pole 34. Referring to FIG. 3, it can be seen that the magnet pole 36 may move in the direction of arrow 56 as necessary to provide adjustment. The plunger 50 will ride over the teeth 48 in a ratcheting manner. As the disc 12 is rotating in the reverse direction, opposite that indicated by arrow 56, and the magnet pole face 40 engages the disc, the magnet pole can not rotate since plunger 50 will prevent such movement. When the brake lining is replaced and the magnet poles must be threaded outwardly, the plungers 50 of the ratchet assemblies are manually released from teeth 48. This may be accomplished by removing spring retainer plugs 58, for example.

The magnet 16 of the brake assembly is adapted to be mounted on a suitable fixed portion of a vehicle or other machine utilizing the brake assembly. When the field coil 20 is electrically energized, magnetic flux flows through the path provided through the magnet, members 30 and 32, magnet poles 34 and 36, and the portion of disc 12 providing surface 24. The magnetic attraction between the disc 12 and the magnet 16 is a function of the amount of electrical energization of the field coil 20. Therefore the braking force applied is a function of the amount of electrical energization of the field coil. The disc 12 may be axially slidable on a spline or mounted on springs to permit necessary movement thereof during brake actuation and release, or the magnet 16 may be mounted for movement axially while being restrained from rotational movement. It may be directly connected to a wheel to be braked or the braking torque exerted thereon may be used to actuate a drum or disc brake mechanism.

What is claimed is:

1. In an electro-magnetically actuated brake having a field coil, an annular magnet, a friction element secured to and extending from said magnet, and a forwardly and reversibly rotatable member to be braked by frictional engagement of said friction element therewith under a force depending upon the strength of the magnetic field generated in said magnet and said rotatable member by energization of said field coil, mechanism forming a magnetic flux path between said magnet and said rotatable member and including means adjusting said mechanism as said friction element wears to prevent braking force engagement between said mechanism and said rotatable member while permitting braking force engagement between said friction element and said rotatable member, said mechanism comprising:

first and second annular threaded sections respectively provided on the inner and outer peripheries of said annular magnet;

first and second annular magnet poles having threads thereon and threaded on said threaded sections for rotational movement relative to said annular magnet and resultant axial movement as said poles are threaded further onto said threaded section; said magnet poles having faces immediately adjacent said rotatable member and engageable therewith, upon wear of said friction element and brake energization, sufficiently to be rotated on said magnet in the direction of rotation of said rotatable member during forward rotation of said rotatable member, and by thread action being moved axially away from said rotatable member sufficiently that braking force is exerted on said rotatable member by said friction element and not by said magnet poles;

said magnet and said threaded sections thereof and said magnet poles and said rotatable member providing the magnetic flux path for said brake;

and selectively releasable means on said magnet and said magnet poles preventing rotation of said magnet poles upon engagement with said rotatable member during reverse rotation of said rotatable member.

2. An electrically actuated disc brake comprising:

a rotatable disc to be braked, a brake actuator including a rotationally stationary friction ring adapted to frictionally engage said disc in braking relation when the brake actuator is actuated, a magnet mounting said friction ring and composed of an inner peripheral magnet pole ring and an outer peripheral magnet pole ring positioned radially adjacent said friction ring and having pole faces positioned axially adjacent said disc, an annular magnet core having an annular axially extending recess opening toward said disc and receiving therein a field coil and said friction ring, an inner and an outer core ring respectively mounted on the inner and outer peripheries of said annular magnet core, said inner core ring and said inner magnet pole ring having mating threads on peripherally adjacent surfaces and said outer core ring and said outer magnet pole ring having mating threads on peripherally adjacent surfaces permitting axial screw movements of said magnet pole rings in one direction axially away from said disc when said magnet pole ring pole faces are moved during brake actuation to engage said disc while said disc is rotating, thereby maintaining a close adjustment of said pole faces to said disc without applying friction braking forces therethrough, and means mounted on said magnet core and limiting screw movements of said magnet pole rings only to the rotational direction resulting in magnet pole ring axial movements away from said disc.

* * * * *